United States Patent
Wu et al.

(10) Patent No.: US 8,427,444 B2
(45) Date of Patent: Apr. 23, 2013

(54) GHOST CANCELLATION METHOD FOR MULTI-TOUCH SENSITIVE DEVICE

(75) Inventors: Hung-Wei Wu, Zhonghe (TW); Chih-Yu Chang, Hsinchu (TW); Tsan-Hwi Chen, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 213 days.

(21) Appl. No.: 12/758,358

(22) Filed: Apr. 12, 2010

(65) Prior Publication Data
US 2011/0248932 A1 Oct. 13, 2011

(51) Int. Cl.
*G06F 3/041* (2006.01)

(52) U.S. Cl.
USPC .......................................................... 345/173

(58) Field of Classification Search .......... 345/173–177, 345/156; 178/18.01–18.07
See application file for complete search history.

(56) References Cited

U.S. PATENT DOCUMENTS

| | | | | |
|---|---|---|---|---|
| 8,174,509 B2* | 5/2012 | Liao et al. | | 345/174 |
| 8,284,080 B2* | 10/2012 | Ng et al. | | 341/26 |
| 2008/0150906 A1* | 6/2008 | Grivna | | 345/173 |
| 2009/0273579 A1* | 11/2009 | Zachut et al. | | 345/174 |
| 2010/0007629 A1* | 1/2010 | Chang | | 345/174 |
| 2010/0007630 A1* | 1/2010 | Chang | | 345/174 |
| 2010/0007631 A1* | 1/2010 | Chang | | 345/174 |
| 2010/0039396 A1* | 2/2010 | Ho et al. | | 345/173 |
| 2010/0149110 A1* | 6/2010 | Gray | | 345/173 |
| 2010/0188345 A1* | 7/2010 | Keskin et al. | | 345/173 |
| 2010/0302180 A1* | 12/2010 | Chang et al. | | 345/173 |
| 2010/0321337 A1* | 12/2010 | Liao et al. | | 345/174 |
| 2011/0063249 A1* | 3/2011 | Chou et al. | | 345/174 |
| 2011/0084924 A1* | 4/2011 | Chang et al. | | 345/173 |
| 2011/0115743 A1* | 5/2011 | Wang et al. | | 345/174 |
| 2011/0157066 A1* | 6/2011 | Waterbury | | 345/174 |
| 2011/0181519 A1* | 7/2011 | Tsai et al. | | 345/173 |
| 2011/0261006 A1* | 10/2011 | Joharapurkar et al. | | 345/174 |
| 2012/0044192 A1* | 2/2012 | Hsu et al. | | 345/174 |

* cited by examiner

*Primary Examiner* — Rodney Amadiz (57) ABSTRACT

A ghost cancellation method for the multi-touch sensitive device is disclosed. The multi-touch sensitive device includes a sensing array having multiple lines of a first axis and multiple lines of a second axis intersecting with each other. All the lines of the sensing array are scanned to determine which ones of the lines are touched, so as to determine touch point candidates. For each touch point candidate, a driving signal is applied to the line of the first axis, and the line of the second axis is detected to check if the touch point candidate is actually touched.

14 Claims, 8 Drawing Sheets

GHOST CANCELLATION METHOD FOR MULTI-TOUCH SENSITIVE DEVICE

TECHNICAL FIELD OF THE INVENTION

The present invention relates to a multi-touch technique, more particularly, to a ghost cancellation method used in a multi-touch sensitive device.

BACKGROUND OF THE INVENTION

In a multi-touch sensitive device such as a touch panel, there are generally two types of sensing methods for sensing one or more touches. One is called a projective sensing method, and the other is a matrix sensing method. In the projective sensing method, the device senses a whole line of a sensing array each time.

In the matrix sensing method, the device senses a node (i.e. in intersection of a row and a column) of the touch sensing array each time. As can be known, performing the matrix sensing method takes much more time than the projective sensing method. For a 20×30 sensing array (i.e. a sensing array having 20 rows and 30 columns), there are 20+=50 lines in all, and therefore only 50 detections are needed when using the projective sensing method. In contrast, there are 20×30=600 nodes, so 600 detections are needed when using the matrix sensing method.

Under considerations of speed and cost, nowadays, the projective sensing method is widely used in various touch devices. However, a disadvantage of projective sensing method is a so-called "ghost issue", which will be described below.

Figure 1:
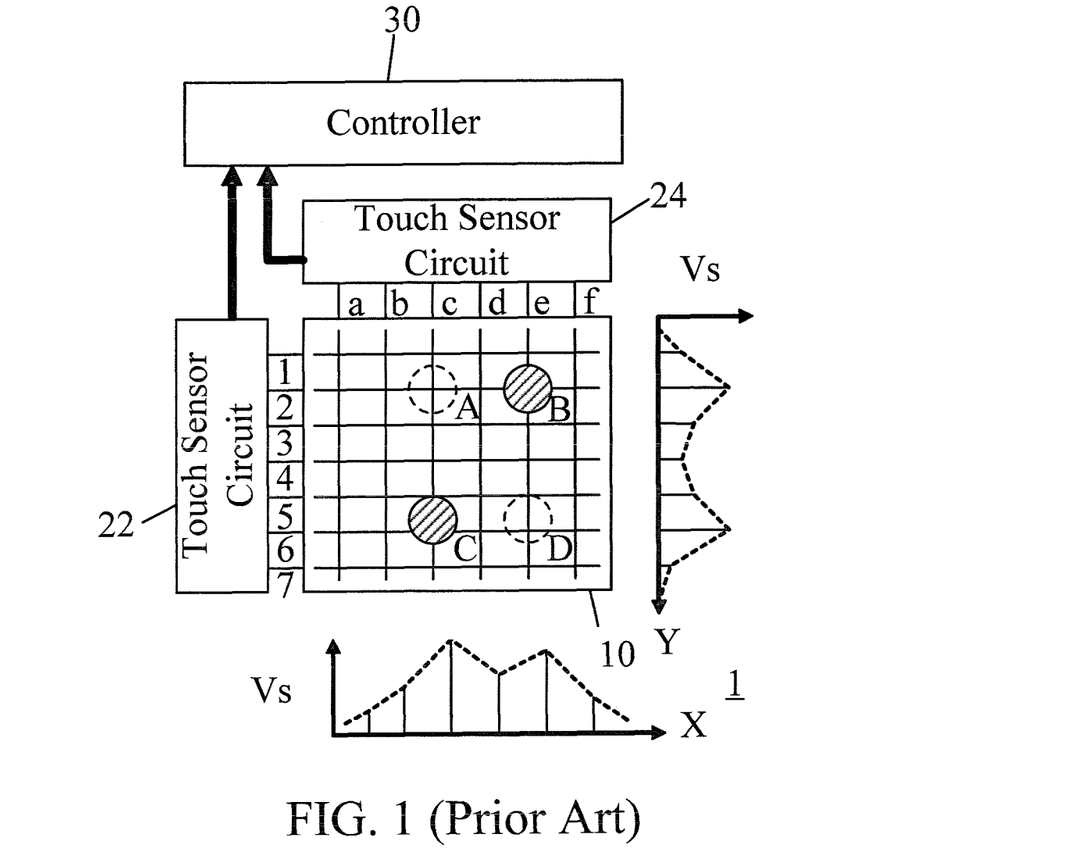
FIG. 1 schematically shows a general multi-touch sensitive device.

FIG. 1 schematically shows a general multi-touch sensitive device 1. The multi-touch sensitive device 1 has a sensing array 10. The sensing array 10 comprises a group of longitudinal conductive traces (e.g. line a to line f) and a group of lateral conductive traces (e.g. line 1 to line 7) arranged as columns and rows of X-Y coordinates. Alternatively, those traces can be arranged as polar coordinates. A number of sensing elements (not shown) are provided at the respective intersections of the traces. The sensing elements are usually implemented by resistors or capacitors, for example. Touch sensor circuits 22 and 24 apply driving signals to the traces and sense if there are touches. Each of the touch sensor circuit 22 and 24 comprises multiple sensors (not shown in this drawing). Each sensor is in charge of driving and sensing one or more of the trace. The touch sensor circuits 22 and 24 are controlled by a controller 30.

In this example, it is assumed that there are two touches occur simultaneously at points B and C, of which the coordinates are respectively (e, 2) (c, 6). The projective sensing method is used. In X-axis direction, it is found that there are two peaks at line c and line e. In Y-axis direction, it is found that there are two peaks at line 2 and line 6. According to the principles of permutation and combination, the four peaks can compose four coordinates: (c, 2), (c, 6), (e, 2) and (e, 6). That is, in addition to the actual touch points B and C, the device 1 will falsely determine that there are also touches occurring at points A(c, 2) and D(e, 6). The points A and D, which are not touched but falsely determined as touched, are called "ghost points".

If each node of the sensing array 10 is detected by using the matrix sensing method, the actual touch positions B and C can be determined, and the ghost issue can be eliminated. However, as mentioned above, it takes too much time to do so.

SUMMARY OF THE INVENTION

An objective of the present invention is to provide a ghost cancellation method for a multi-touch sensitive device to effectively and efficiently eliminate ghost points when there are plural touches occurring on the device.

In accordance with the present invention, in a multi-touch sensitive device, which includes a sensing array having multiple lines of a first axis and multiple lines of a second axis intersecting with each other, the ghost cancellation method includes applying a driving signal to each line of the first axis; detecting the driven line of the first axis to determine whether this line is touched or not; applying a driving signal to each line of the second axis; detecting the driven line of the second axis to determine whether said line is touched or not; determining touch point candidates based on touched lines of the first axis and touched lines of the second axis; applying a driving signal to the line of the first axis for each touch point candidate; and detecting the line of the second axis for the touch point candidate to determine whether said touch point candidate is touched or not.

BRIEF DESCRIPTION OF THE DRAWINGS

The present invention will be described in detail in conjunction with the appending drawings, in which.

DETAILED DESCRIPTION OF THE INVENTION

As described, for a multi-touch sensitive device 1, the projective sensing method can rapidly finish detections to determine touch points. However, these determined touch points may include ghost points. Nevertheless, it takes too much time to detect all nodes by using the matrix sensing method to find the actual touch points. The present invention provides a ghost cancellation method for dealing with such a problem.

In the ghost cancellation method of the present invention, firstly, touch point candidates are determined by using the projective sensing method, and then the touch point candidates are tested by the matrix sensing method so as to verify the actual touch points and eliminate ghost points.

Figure 2:
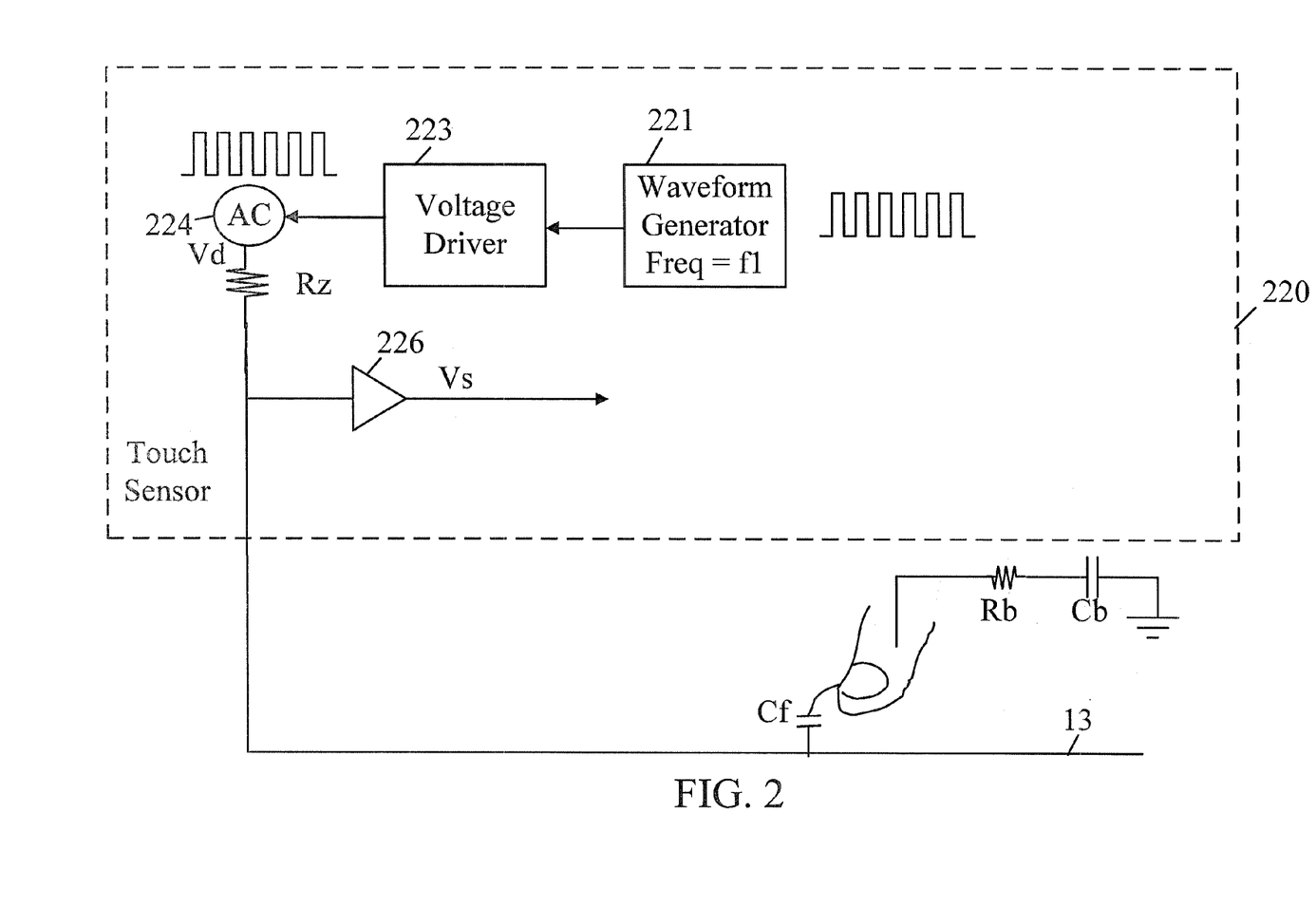
FIG. 2 schematically shows a touch sensor implementing the projective sensing method.

FIG. 2 schematically shows an example of a touch sensor 220 implementing the projective sensing method. As mentioned, the touch sensor circuits 22 and 24 respectively comprise multiple touch sensors for driving and sensing respective lines of the sensing array 10 of FIG. 1. The touch sensor 220 has a waveform generator 221, which generates a square wave (or sine wave) with a frequency f1. The square wave is applied to a voltage driver 223 to drive an AC based on the square wave. The driving signal Vd has amplitude V1. The voltage source 224 is connected to a line 13 (e.g. one of the traces of the sensing array 10 in FIG. 1) via a resistive divider Rz. One end of the resistive divider Rz is connected with the voltage source 224, while the other end thereof is connected with the line 13 and also one end (i.e. input) of a buffer 226. A sensing signal Vs is detected at the other end (i.e. output) of the buffer 226. The sensing signal Vs is sent to a sensing circuit (not shown) of the sensor 220. The buffer 226 is used to isolate impedances at the two ends so that the sensing circuit will not be influenced by external impedance.

When the line 13 is not touched, the line 13 is floating, and therefore, ideally, the sensing signal Vs should be substantially the same as the driving signal Vd at this time. When the line 13 is touched by a human finger, the line 13 is grounded via the human body, results in a voltage drop Vp, which can be calculated as:

$$V_p = V1 \times \frac{\frac{1}{j\omega Cf} + Rb \frac{1}{j\omega Cb}}{Rz + \frac{1}{j\omega Cf} + Rb + \frac{1}{j\omega Cb}} \quad (1)$$

where Cf is the coupling capacitance between the human finger and the line 13, Cb indicates the equivalent capacitance of the human body, Rb indicates the equivalent resistance of the human body, and $\omega=2\pi f1$. Due to the voltage drop Vp, the amplitude of the sensing signal Vs is reduced when the line 13 is touched. That is, the "non-touched" amplitude of the sensing signal V1 is greater than the "touched" amplitude thereof. Thus, it can be determined whether the line 13 is touched or not by checking the amplitude of the sensing signal Vs. The rows and columns of the sensing array 10 (FIG. 1) are all detected in this manner, so that which of the rows and which of the columns are touched can be known. It is noted that more than one line can be driven at the same time by using different driving signals such as driving signals with different frequencies. In addition, more than one line can be detected at the same time. Touch point candidates can be determined by these touched rows and columns. It is noted that these touch point candidates include actual touch points and ghost points as described above. For a two-dimensional sensing array, the number of the touched rows and the number of the touched columns should be the same. The touch point candidates are at the intersections of the touched columns and the touched rows. The number of the touch point candidates is a product of the number of the touched rows and the number of the touched columns. For example, if there are two rows and two columns are touched, there will be four touch point candidates.

Figure 3:
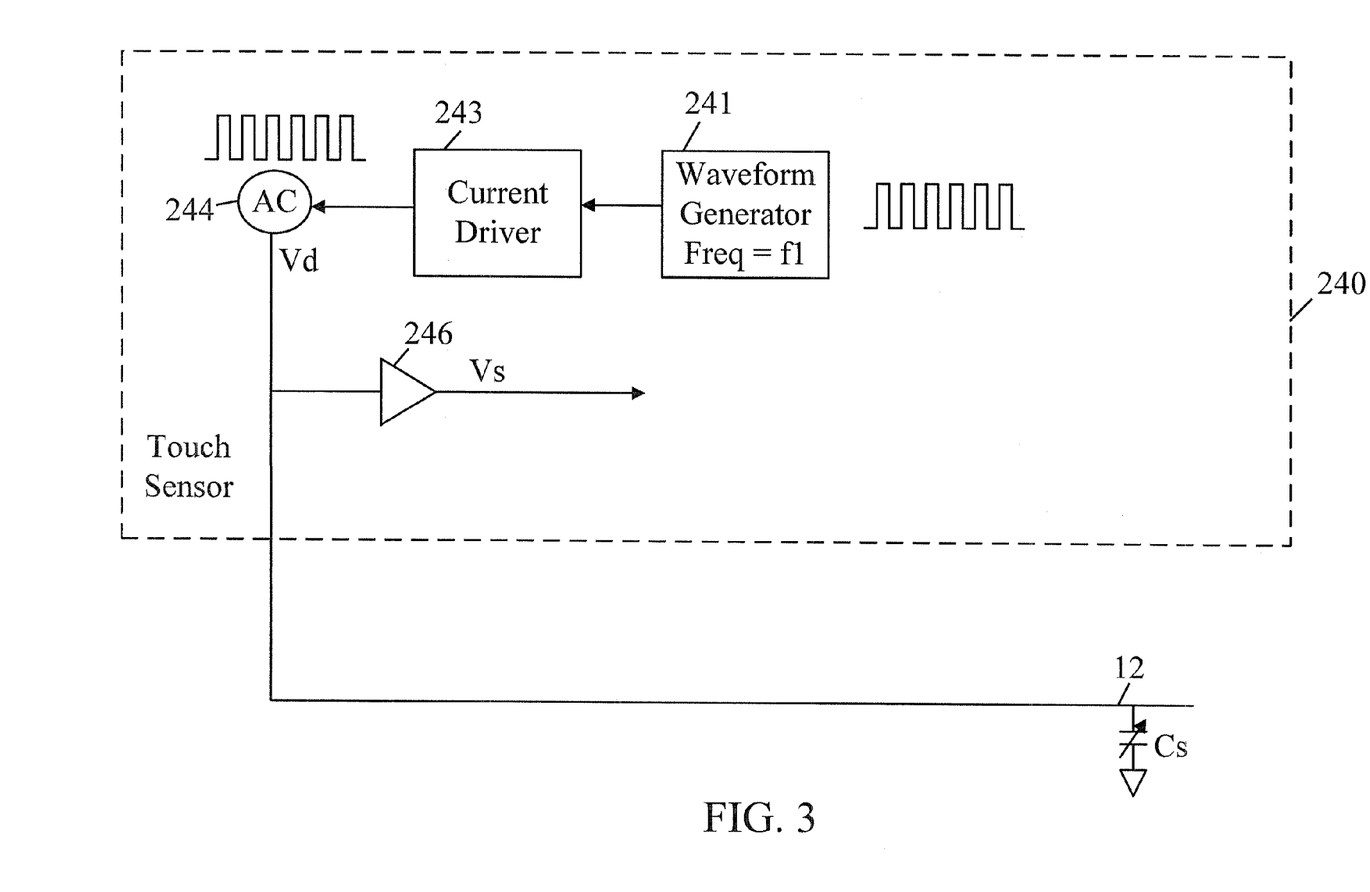
FIG. 3 schematically shows another touch sensor implementing the projective sensing method.

FIG. 3 schematically shows another type of a touch sensor 240 implementing the projective sensing method. The touch sensor 240 has a waveform generator 241, which generates a square wave (or sine wave) with a frequency f1. The square wave is applied to a current driver 243 to drive an AC current source 244. The AC current source 244 then generates a driving signal Id based on the square wave. The driving signal Id is used to drive a line 12. In the drawing, a capacitor Cs represents a capacitance observed from the line 12. When the line 12 is touched, the capacitance of Cs changes. Therefore, it can be determined whether the line 12 is touched or not by observing the capacitance of Cs. It is noted that other suitable types of touch sensors can also be used so as to detect all the lines (i.e. all columns and rows) of the sensing array, and thereby determining the touch point candidates.

If two fingers touch the multi-touch sensitive device 1 at the same time, there will be four touch point candidates at most. In the method of the present invention, those touch point candidates are checked by using the matrix sensing method. The details will be further described below.

Figure 4:
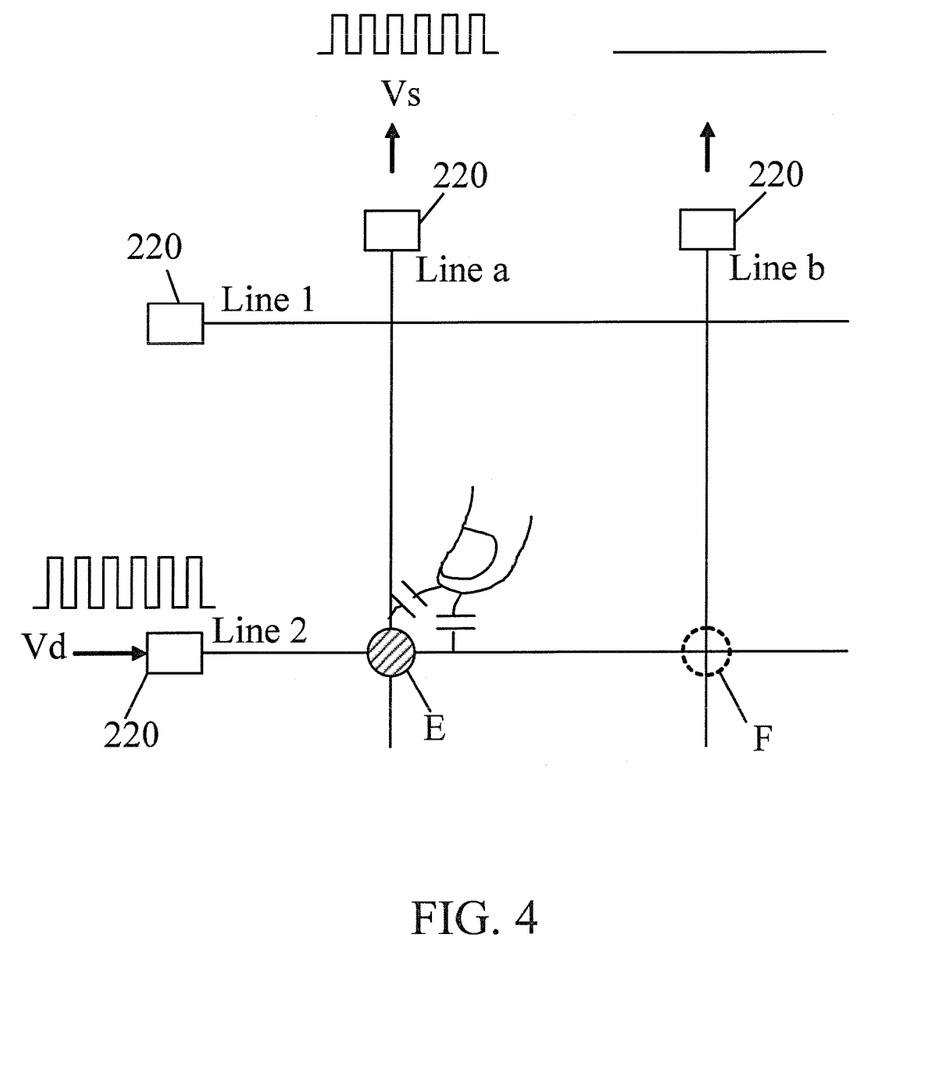
FIG. 4 schematically shows testing a node of a touch array by using the matrix sensing method in accordance with the present invention.

FIG. 4 schematically shows testing a node of a touch array by using the matrix sensing method. As shown, each line of the sensing array is connected to a touch sensor 220 of FIG. 2 (or a touch sensor 240 of FIG. 3) in the present embodiment. It is also possible that several lines share one touch sensor in a multiplexing manner. For the sake of simplification and clarity, only two rows Line 1 and Line 2 and two columns Line a and Line b are shown in this drawing. In the example shown in FIG. 4, a point E is an actual touch point, while a point F indicates a ghost point. Both the points E and F are touch point candidates. The point E is at the intersection of Line a and Line 2, and therefore the coordinate thereof is (a, 2). The point F is at the intersection of Line b and Line 2, and therefore the coordinate is (b, 2). To test a node (i.e. an intersection of a specific row and a specific column), the driving signal (e.g. Vd) is applied to the line of the first axis (e.g. X-axis), that is, the row in relation to the node, and the line of the second axis (e.g. Y-axis), that is, the column in relation to the node, is detected so as to obtain the sensing signal (e.g. Vs). Alternatively, the driving signal is sent to the column in relation to the node, and the row in relation to the node is detected.

To check whether the point E is touched or not, the driving signal Vd is applied to Line 2, and Line a is detected. Since the point E is actually touched by a finger, a conductive loop is formed between Line 2 and Line a via the human body, so that a sensing signal Vs can be detected from Line a. Ideally, the sensing signal Vs is substantially the same as the driving signal Vd.

To check whether the point F is touched or not, the driving signal Vd is applied to Line 2, and Line b is detected. Since the point F is not touched, no conductive loop is formed between Line 2 and Line b. Therefore, no sensing signal is obtained when detecting Line b. Accordingly, it is determined that the point F is a ghost point.

FIGS. 5A to 5D illustrate testing touch point candidates by the method in accordance with an embodiment of the present invention. The multi-touch sensitive device shown in these drawings is similar to that of FIG. 1, the same reference numbers indicate the same components, and the relevant descriptions are omitted herein to avoid repetition and redundancy. As mentioned, each of the touch sensor circuits 22 and 24 comprises a plurality of touch sensors (e.g. the sensors 220 or 240 shown in FIG. 2 and FIG. 3).

All the rows and columns of the sensing array 10, that is, Lines 1-7 and Lines a-f, are scanned by using the projective sensing method to determine which ones of the lines are touched. By doing so, several touch point candidates can be determined. As described, when the points B and C are touched at the same time, in addition to the point B and C, the device 1 will also take the point A and D for the touch points by using projective sensing method. In other words, there are four touch point candidates A, B, C, D. In the present embodiment, the touch point candidates are checked one by one.

Figure 5A:
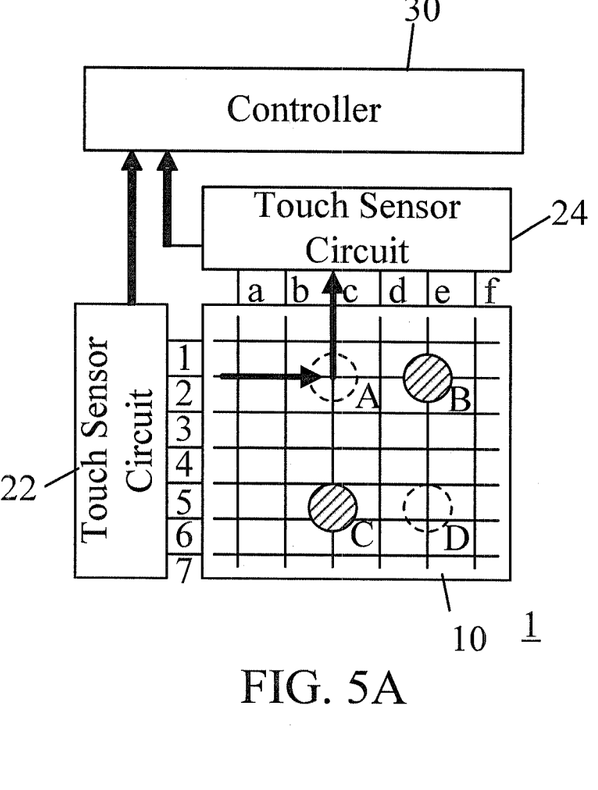
FIGS. 5A to 5D illustrate testing touch point candidates by the method in accordance with an embodiment of the present invention.
Figure 5B:
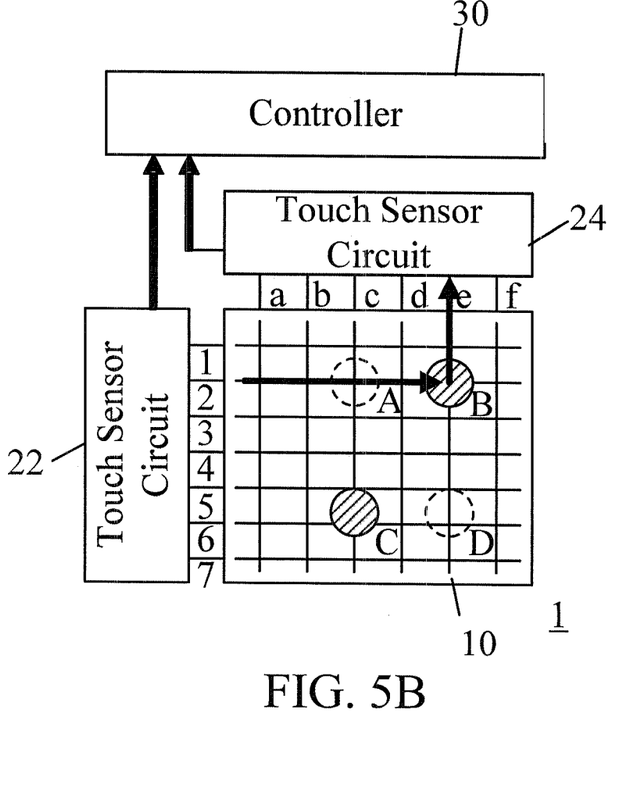
Figure 5C:
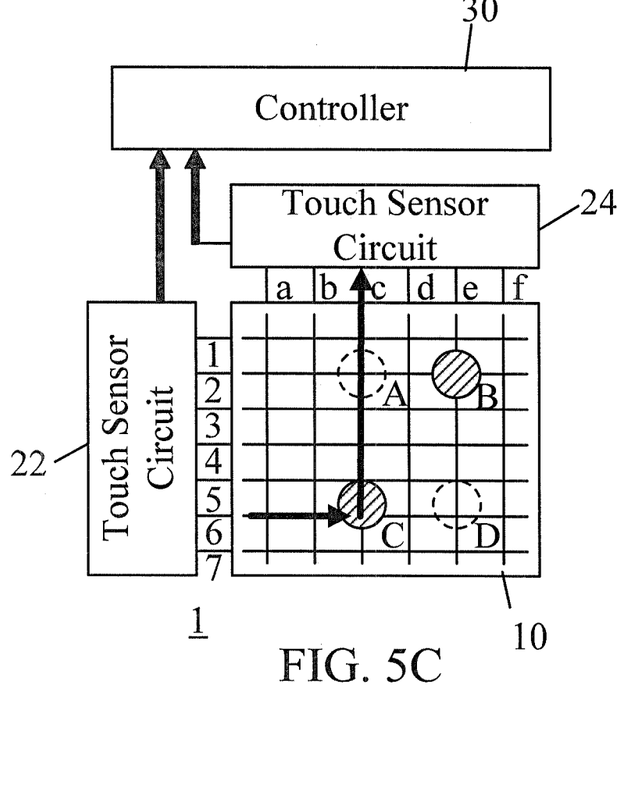
Figure 5D:
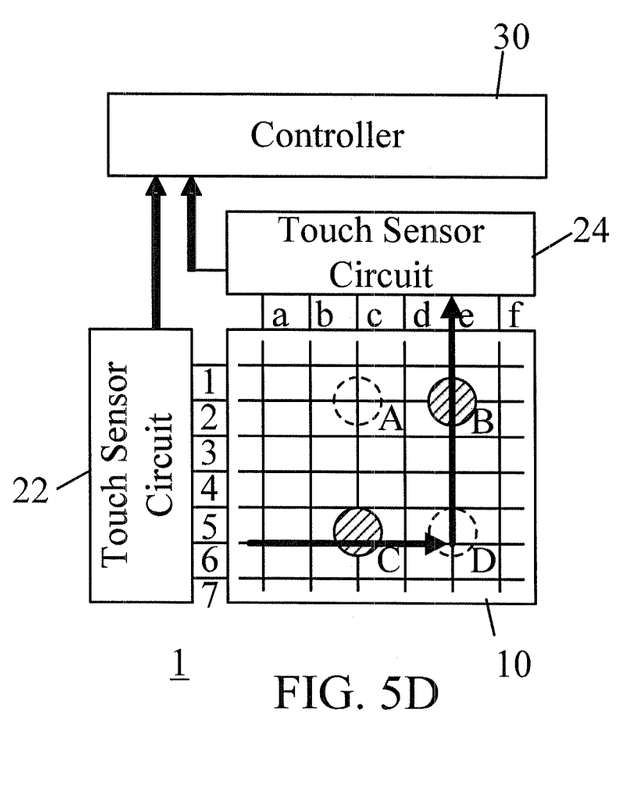

As shown in FIG. 5A, the point A is checked. The driving signal is applied to Line 2, and Line c is detected. Since the point A is not touched, no sensing signal is detected from Line b. As shown in FIG. 5B, the point B is then checked. The driving signal is applied to Line 2, and Line e is detected. Since the point B is touched, a sensing signal is detected from Line e. As shown in FIG. 5C, the point C is checked. The driving signal is applied to Line 6, and Line c is detected. Since the point C is touched, a sensing signal is detected from Line c. As shown in FIG. 5D, the point D is checked. The driving signal is applied to Line 6, and Line e is detected. Since the point D is not touched, no sensing signal is detected from Line e.

Figure 6A:
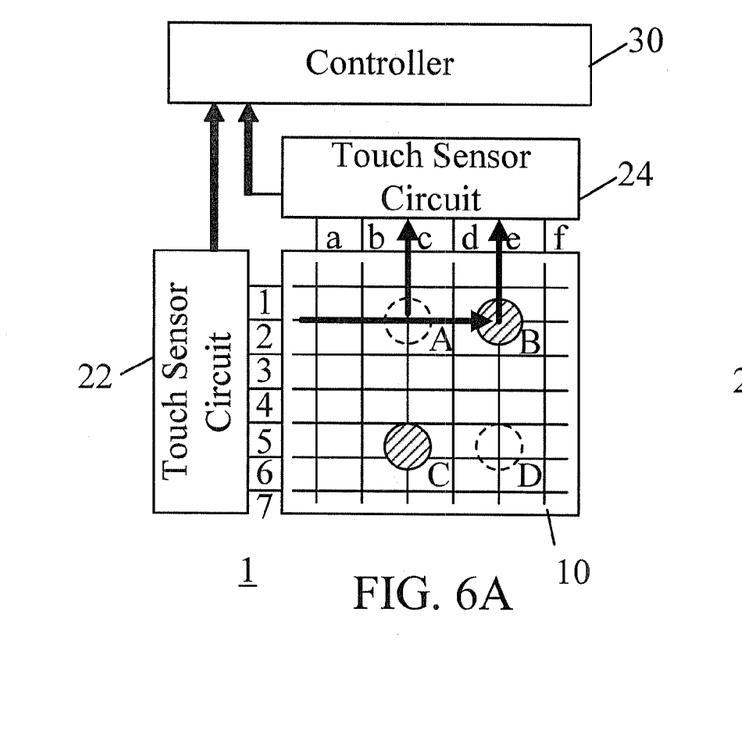
FIGS. 6A and 6B illustrate testing touch point candidates by the method in accordance with another embodiment of the present invention.

FIGS. 6A and 6B illustrate testing touch point candidates by the method in accordance with another embodiment of the present invention. The difference between the present embodiment and the previous embodiment is that the touch point candidates on the same row are checked at the same time. As shown in FIG. 6A, the touch point candidates A and B are checked at the same time. The driving signal is applied to Line 2, and Line c and Line e are detected at the same time. Since the point A is not touched while the point B is touched, no sensing signal is detected from Line c but a sensing signal is detected from Line e.

Figure 6B:
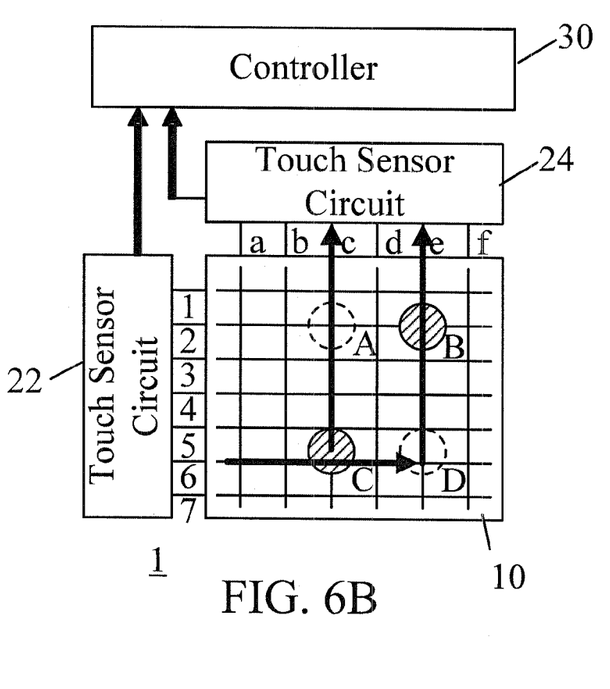

Similarly, as shown in FIG. 6B, the touch point candidates C and D are checked at the same time. The driving signal is applied to Line 6, and Line c and Line e are detected at the same time. Since the point C is touched while the point D is not touched, a sensing signal is detected from Line c but no sensing signal is detected from Line e.

Figure 7:
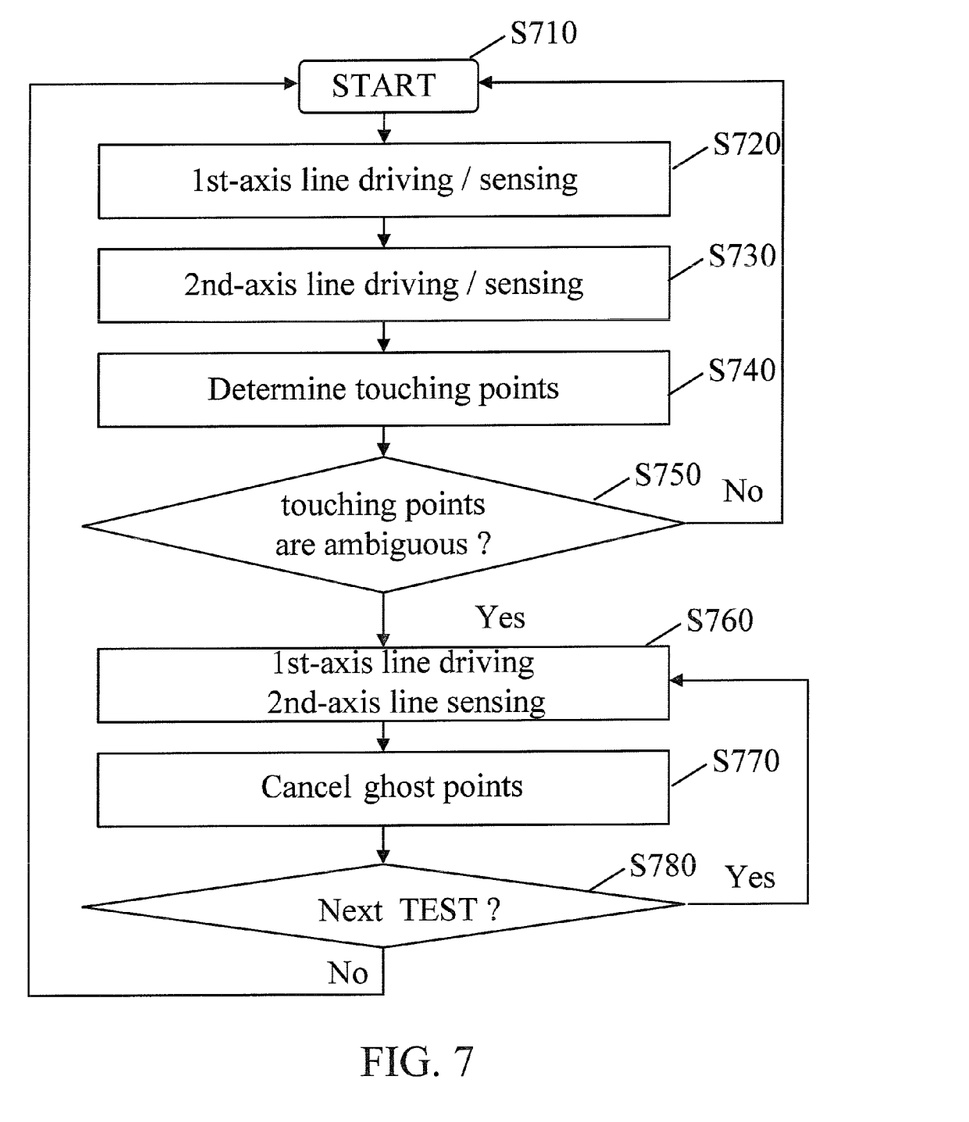
FIG. 7 is a flow chart showing the ghost cancellation method of the present invention.

The ghost cancellation method for the multi-touch sensitive device of the present invention can be summed up into a flow chart as shown in FIG. 7. The multi-touch sensitive device 1 has a sensing array 10. The sensing array 10 has multiple lines of a first axis (e.g. X-axis) and multiple lines of a second axis (e.g. Y-axis). The lines of the first axis and the lines of the second axis intersect with each other. The process starts at step S710. In step S720, a driving signal is applied to each line of the first axis (e.g. X-axis), and the same line is detected. As described above, if a specific line is not touched, a sensing signal detected from this line is substantially the same as the driving signal. If a specific line is touched, the amplitude of the sensing signal detected from this line is reduced. In this step, touched lines of the first axis are found. In step S730, a driving signal is applied to each line of the second axis (e.g. Y-axis), and the same lines is detected. In this step, touched lines of the second axis are found. In step S740, touch points are determined by analyzing the sensing signals. That is, the touch points are preliminarily determined based on the touched lines of the first axis and the touched lines of the second axis. In step S750, it is judged whether the determined touch points are ambiguous. Various algorithms can be used in this step. Anyway, the judge technique is not the issue to be discussed in the present invention. If the preliminarily determined touch points are not ambiguous, the process returns to step S710 to proceed the next round of sensing touch(es). If the preliminarily determined touch points are ambiguous, it means that those determined touch points include ghost points, the process goes to step S760 to eliminate the ghost points.

The ambiguous touch points are touch point candidates now. In step S760, the touch point candidates are checked. A driving signal is applied to the first-axis line of a touch point candidate, and the second-axis line of this touch point candidate is detected. In this step, it is determined that the checked touch point candidate is an actual touch point or a ghost point. In step S770, the ghost point is cancelled according to the result of the step S760. In step S780, it is determined whether testing for the next touch point candidate is to be executed. If so, the process returns to step S760.

It is possible to drive plural first-axis lines of the touch point candidates at the same time by using different driving signals. In addition, as the example described with reference to FIGS. 6A and 6B, the second-axis lines of the touch point candidates can be detected at the same time by different sensors, for example, so that the touch point candidates on the same first-axis line can be tested one time.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A ghost cancellation method for the multi-touch sensitive device, the multi-touch sensitive device comprising a sensing array having multiple lines of a first axis and multiple lines of a second axis intersecting with each other, the method comprising the following sequential steps:
 applying a driving signal to each line of the first axis;
 detecting the driven line of the first axis to determine whether said line is touched or not;
 applying a driving signal to each line of the second axis;
 detecting the driven line of the second axis to determine whether said line is touched or not;
 determining touch point candidates based on the touched lines of the first axis and the touched lines of the second axis;
 applying a driving signal to the line of the first axis for each touch point candidate; and
 detecting the line of the second axis for the touch point candidate to determine whether said touch point candidate is touched or not.

2. The method of claim 1, wherein the touch point candidates are at intersections of the touched lines of the first axis and the touched lines of the second axis.

3. The method of claim 1, wherein the first axis is X-axis and the second axis is Y-axis.

4. The method of claim 1, wherein the first axis is Y-axis and the second axis is X-axis.

5. The method of claim 1, wherein a plurality of lines of the first axis are applied with different driving signals at the same time in the step of applying a driving signal to the line of the first axis for each touch point candidate.

6. The method of claim 1, wherein a plurality of lines of the second axis are detected at the same time in the step of detecting the line of the second axis for the touch point candidate.

7. The method of claim 6, wherein the lines of the second axis for the touch point candidates on the same line of the first axis are detected at the same time.

8. The method of claim 1, wherein a sensing signal with amplitude less than the driving signal is detected from the line of the first axis after the line is applied with the driving signal if said line is touched.

9. The method of claim 1, wherein a sensing signal with amplitude less than the driving signal is detected from the line of the second axis after the line is applied with the driving signal if said line is touched.

10. The method of claim 1, wherein a sensing signal is detected from the line of the second axis for the touch point candidate after the driving signal is applied to the line of the first axis for said touch point candidate if said touch point candidate is actually touched, while no sensing signal is detected from the line of the second axis for the touch point candidate after the driving signal is applied to the line of the first axis for said touch point candidate if said touch point candidate is not touched.

11. The method of claim 1, wherein a plurality of lines of the first axis are applied with different driving signals at the same time in the step of applying a driving signal to each line of the first axis.

12. The method of claim 1, wherein a plurality of lines of the second axis are applied with different driving signals at the same time in the step of applying a driving signal to each line of the second axis.

13. The method of claim 1, wherein a plurality of lines of the first axis are detected at the same time in the step of detecting the driven line of the first axis to determine whether said line is touched or not.

14. The method of claim 1, wherein a plurality of lines of the second axis are detected at the same time in the step of detecting the driven line of the second axis to determine whether said line is touched or not.

* * * * *